(12) United States Patent
Shih

(10) Patent No.: US 6,962,312 B2
(45) Date of Patent: Nov. 8, 2005

(54) DISPLAY APPARATUS WITH ADJUSTABLE SUPPORTING DEVICE

(75) Inventor: Albert Shih, Chung Ho (TW)

(73) Assignee: Amtran Technology Co., Ltd., Chung Ho (TW)

( * ) Notice: Subject to any disclaimer, the term of this patent is extended or adjusted under 35 U.S.C. 154(b) by 0 days.

(21) Appl. No.: 10/752,105

(22) Filed: Jan. 6, 2004

(65) Prior Publication Data

US 2005/0145759 A1 Jul. 7, 2005

(51) Int. Cl.⁷ .............................................. A47F 5/00
(52) U.S. Cl. .................................... 248/122.1; 248/918
(58) Field of Search ........................ 248/122.1, 125.2, 248/124.1, 125.1, 917, 918, 919, 920, 922, 248/923, 921, 454, 455, 456, 457, 136; 361/681, 361/682

(56) References Cited

U.S. PATENT DOCUMENTS 4,989,813 A * 2/1991 Kim et al. ............... 248/184.1
5,812,368 A * 9/1998 Chen et al. .................. 361/681
6,822,857 B2 * 11/2004 Jung et al. .................. 361/681
2004/0021051 A1 * 2/2004 Chiu ........................... 248/371
2004/0211866 A1 * 10/2004 Jung et al. .................. 248/133

* cited by examiner

Primary Examiner—Robert P. Olszewski
Assistant Examiner—A. Joseph Wujciak, III
(74) Attorney, Agent, or Firm—Frommer Lawrence & Haug LLP; Ronald R. Santucci

(57) ABSTRACT

In a display apparatus, an adjustable supporting device for supporting a display panel includes a support member having a support portion extending inclinedly from a base portion and formed with an upper pivot end opposite to a lower connecting end, which is connected to a rear end of the base portion, in an upright direction, and a pivot unit that includes a pivot plate disposed to confront a coupling member mounted on the display panel, a first pivot member interconnecting pivotally the coupling member and the pivot plate such that the coupling member is rotatable relative to the pivot plate about a first axis, and a second pivot member interconnecting pivotally the pivot plate and the support portion such that the pivot plate is rotatable relative to the support portion about a second axis transverse to the first axis and the upright direction.

5 Claims, 8 Drawing Sheets

DISPLAY APPARATUS WITH ADJUSTABLE SUPPORTING DEVICE

BACKGROUND OF THE INVENTION

1. Field of the Invention

The invention relates to a display apparatus, more particularly to a display apparatus with an adjustable supporting device.

2. Description of the Related Art

Referring to FIG. 1, a conventional display apparatus, such as a liquid crystal display 1, is shown to include a display panel 11, a support frame 12, and a pivot member 122. The display panel 11 has opposite front and rear surfaces 111, 112, and a coupling member 113 mounted on the rear surface 112. The support frame 12 has a base portion 121 adapted to be disposed on a table (not shown), and a support portion 123 connected to the base portion 121. The pivot member 122 interconnects pivotally the coupling member 113 and the support portion 123 such that the display panel 11 is rotatable relative to the support portion 123 about an axis 100.

As shown in FIG. 2, a computer table 3 is designed to have an inclined supporting frame 32 for supporting a CRT monitor 4 at an optimum viewing angle. However, the conventional liquid crystal display 1 is not suited for use with the aforesaid computer table 3.

SUMMARY OF THE INVENTION

Therefore, the object of the present invention is to provide a display apparatus that has an adjustable supporting device capable of supporting a display panel in an inclined position.

According to one aspect of the present invention, a display apparatus comprises:

a display panel having opposite upper and lower ends; and
an adjustable supporting device for supporting the display panel, the supporting device including
  a support member having a base portion with opposite front and rear ends, and a support portion extending inclinedly from the base portion and formed with a lower connecting end connected to the rear end of the base portion and an upper pivot end opposite to the connecting end in an upright direction,
  a coupling member mounted on the display panel, and
  a pivot unit connected pivotally to the support member and the coupling member, and including a pivot plate disposed to confront the coupling member, a first pivot member interconnecting pivotally the coupling member and the pivot plate such that the coupling member is rotatable relative to the pivot plate about a first axis transverse to the coupling member, and a second pivot member interconnecting pivotally the pivot plate and the upper pivot end of the support portion such that the pivot plate is rotatable relative to the support portion about a second axis transverse to the first axis and the upright direction.

According to another aspect of the present invention, a display apparatus comprises:

a display panel having opposite upper and lower ends; and
an adjustable supporting device for supporting the display panel, the supporting device including
  a support member having a base portion with opposite front and rear ends, and a support portion extending inclinedly from the base portion and formed with a lower connecting end connected to the rear end of the base portion and an upper pivot end opposite to the connecting end in an upright direction,
  a coupling member mounted on the display panel, and
  a pivot unit connected pivotally to the support member and the coupling member, and including a pivot plate disposed to confront the coupling member, a first pivot member interconnecting pivotally the coupling member and the pivot plate such that the coupling member is rotatable relative to the pivot plate about a first axis parallel to the coupling member and transverse to the upright direction, and a second pivot member interconnecting pivotally the pivot plate and the upper pivot end of the support portion such that the pivot plate is rotatable relative to the support portion about a second axis transverse to the coupling member.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
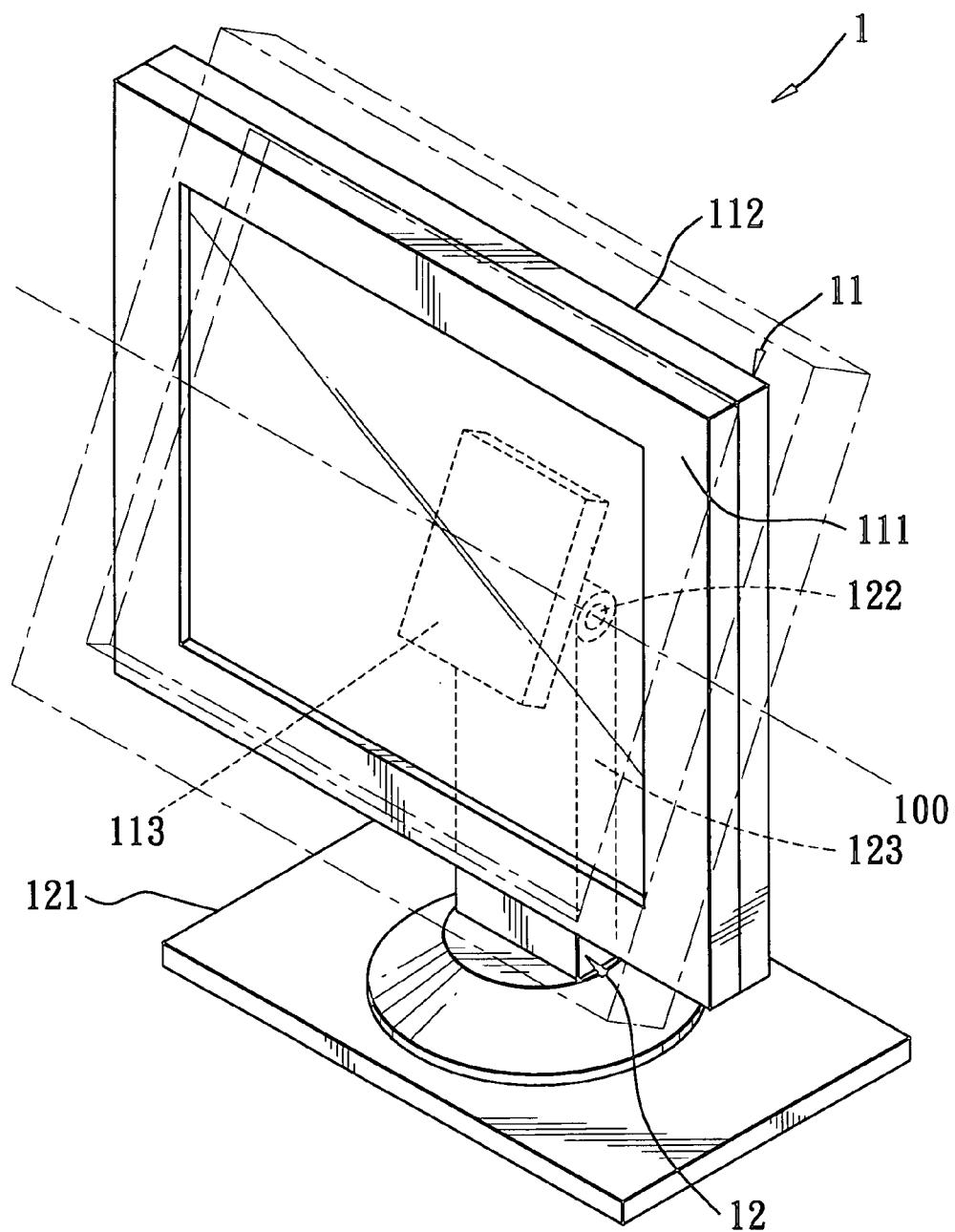
FIG. 1 is a perspective view illustrating a conventional display apparatus in a state of use.
Figure 2:
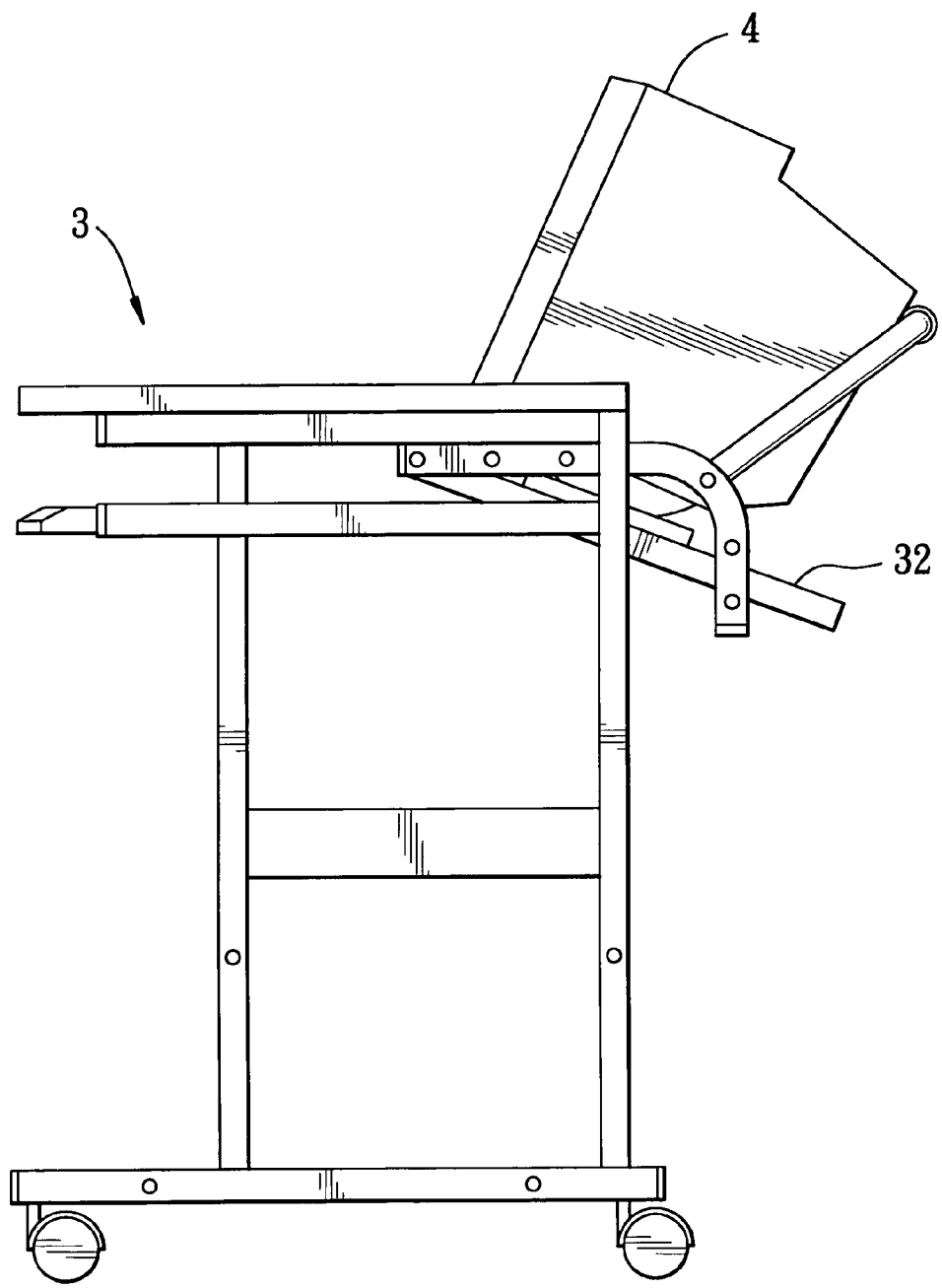
FIG. 2 is schematic side view showing a conventional CRT monitor disposed on a computer table.

Before the present invention is described in greater detail, it should be noted that like elements are denoted by the same reference numerals throughout the disclosure.

Figure 3:
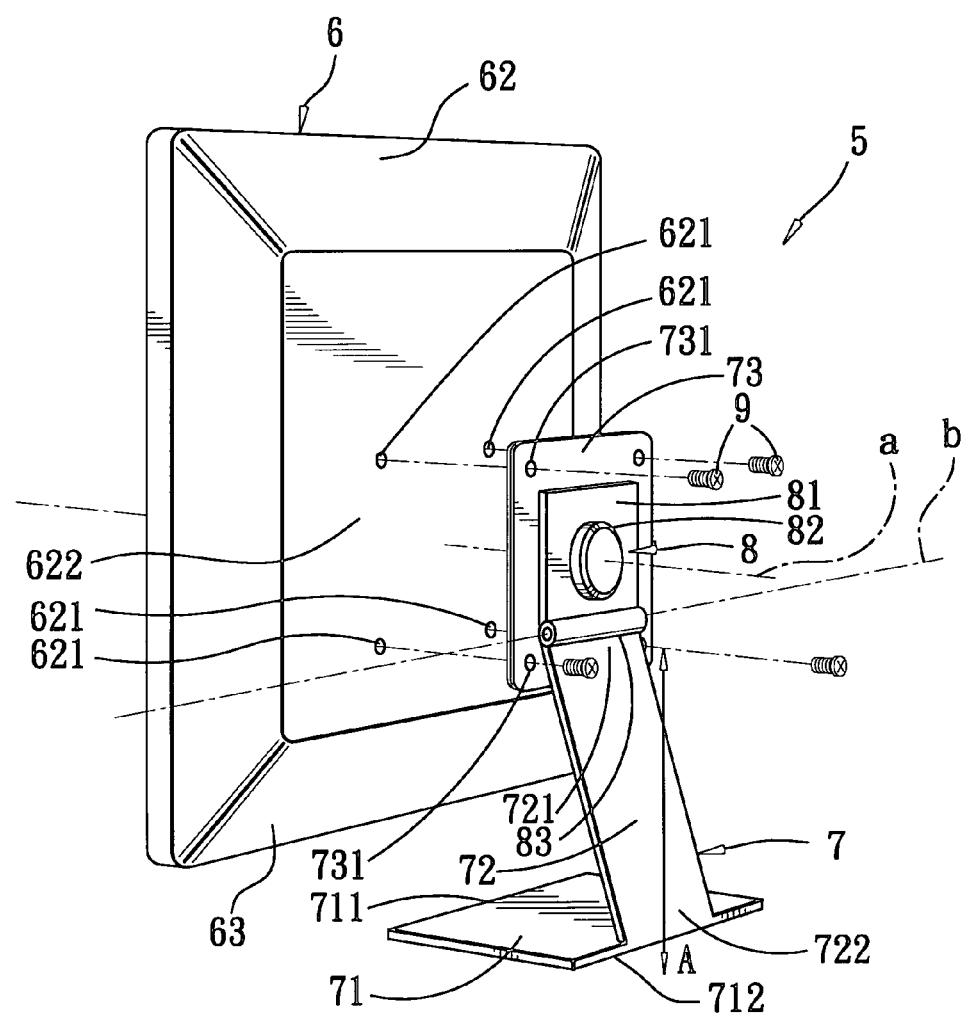
FIG. 3 is an exploded perspective view showing the first preferred embodiment of a display apparatus according to the present invention.

Referring to FIG. 3, the first preferred embodiment of a display apparatus 5 according to the present invention is shown to include a display panel 6, and an adjustable supporting device.

The display panel 6 is a liquid crystal display panel having opposite upper and lower ends 62, 63, and a rear surface 622 formed with a plurality of anchoring holes 621.

The adjustable supporting device is used for supporting the display panel 6, and includes a support member 7, a coupling member 73, and a pivot unit 8.

The support member 7 has a base portion 71 with opposite front and rear ends 711, 712, and a support portion 72 extending inclinedly from the base portion 71 and formed with a lower connecting end 722 connected to the rear end 712 of the base portion 71 and an upper pivot end 721 opposite to the connecting end 722 in an upright direction (A).

The coupling member 73 is mounted on the display panel 6 in a known manner. In this embodiment, the coupling member 73 is formed with a plurality of fastener holes 731. A plurality of screw fasteners 9 extend through the fastener holes 731 and are anchored in the anchoring holes 621 in the rear surface 622 of the display panel 6.

Figure 4:
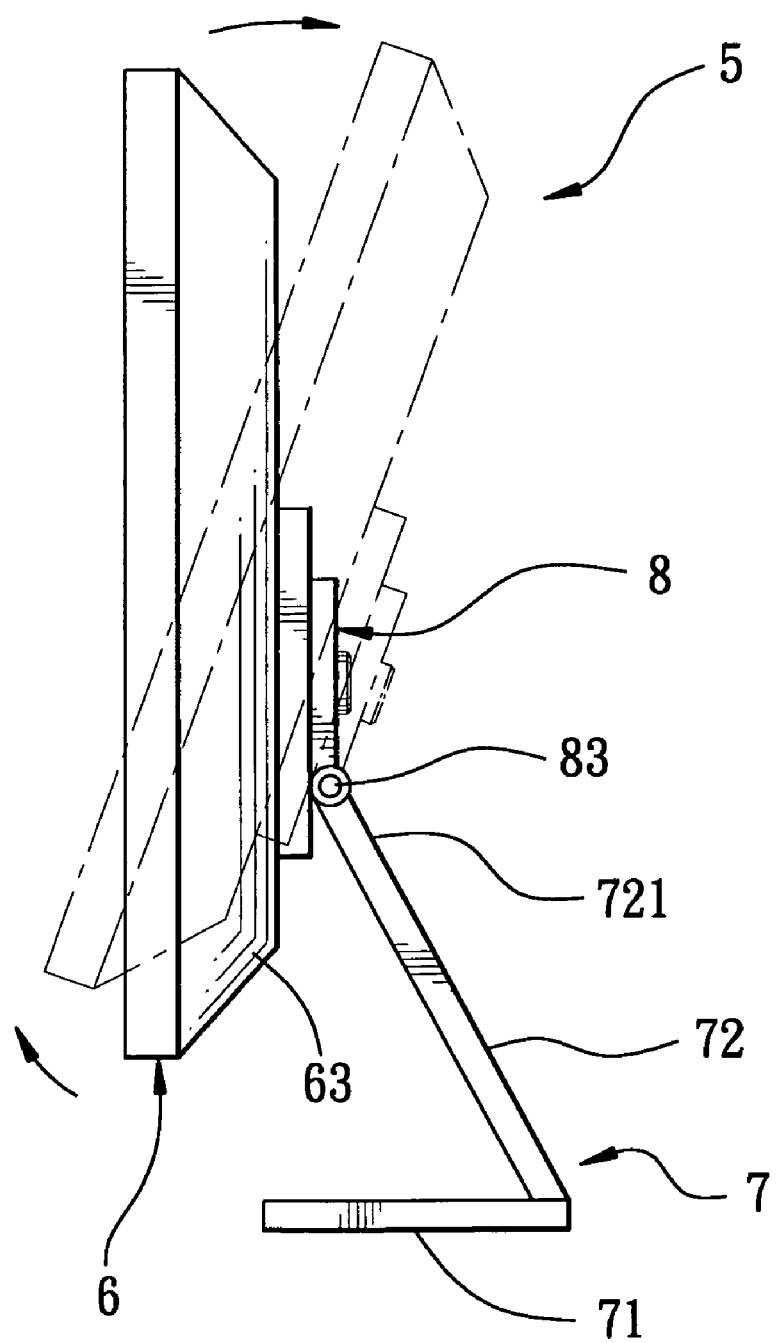
FIG. 4 is a schematic side view illustrating the first preferred embodiment in a state of use.

The pivot unit 8 is connected pivotally to the support member 7 and the coupling member 73. The pivot unit 8 includes a pivot plate 81 disposed to confront the coupling member 73, a first pivot member 82 interconnecting pivotally the coupling member 73 and the pivot plate 81 such that the coupling member 73 is rotatable relative to the pivot plate 81 about a first axis (a) transverse to the coupling member 73, and a second pivot member 83 interconnecting pivotally the pivot plate 81 and the upper pivot end 721 of the support portion 72 such that the pivot plate 81 is rotatable relative to the support portion 72 about a second axis (b) transverse to the first axis (a) and the upright direction (A), as shown in FIG. 4.

Figure 5:
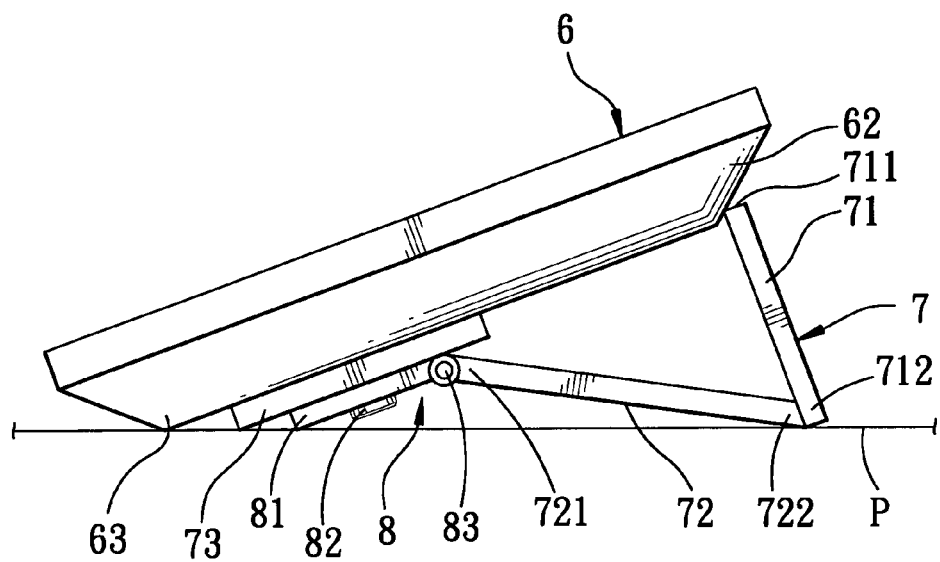
FIG. 5 is a schematic side view illustrating the first preferred embodiment in another state of use.
Figure 6:
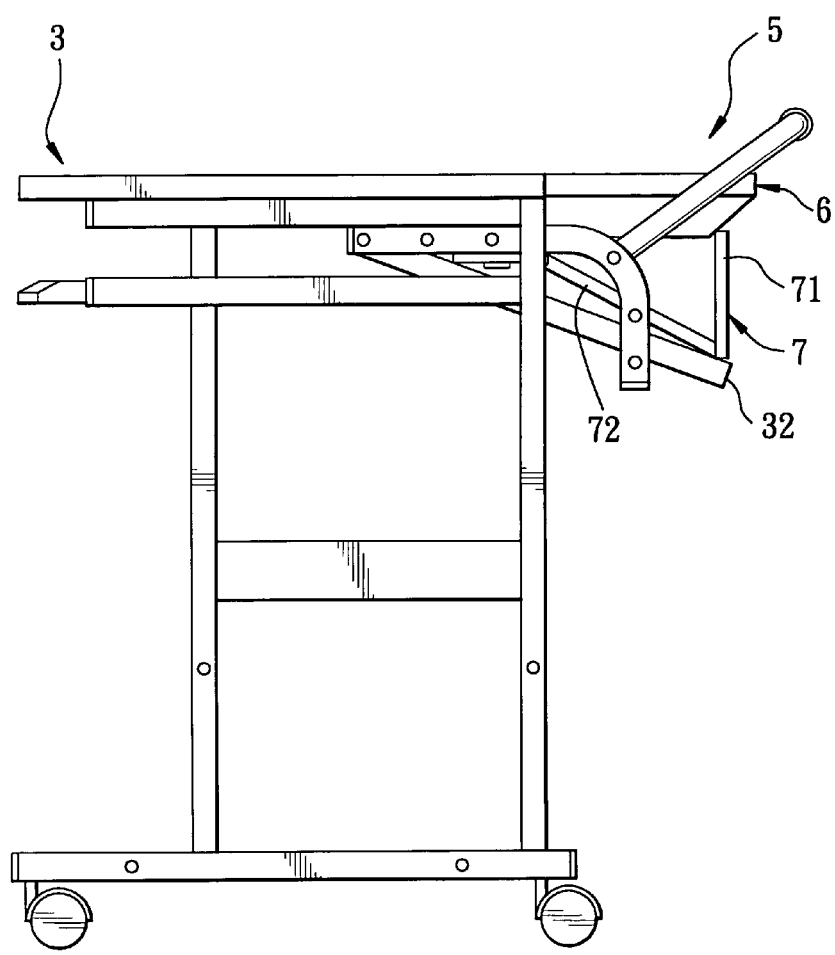
FIG. 6 is a schematic side view illustrating the first preferred embodiment in a further state of use.

Referring to FIG. 5, after 180° of rotation of the display panel 6 about the first axis (a), the adjustable support device is capable of supporting the display panel 6 in an inclined position relative to a plane (P), where the lower end 63 of the display panel 6 is adapted to abut against the plane (P), where the rear end 712 of the base portion 71 and the lower connecting end 722 of the support portion 72 are adapted to abut against the plane (P), and where the front end 711 of the base portion 71 abuts against the upper end 62 of the display panel 6. As such, when the display panel 6 is disposed in the inclined position, the display apparatus 5 of present invention can be stably disposed on an inclined supporting frame 32 of a conventional computer table 3, as shown in FIG. 6.

Figure 7:
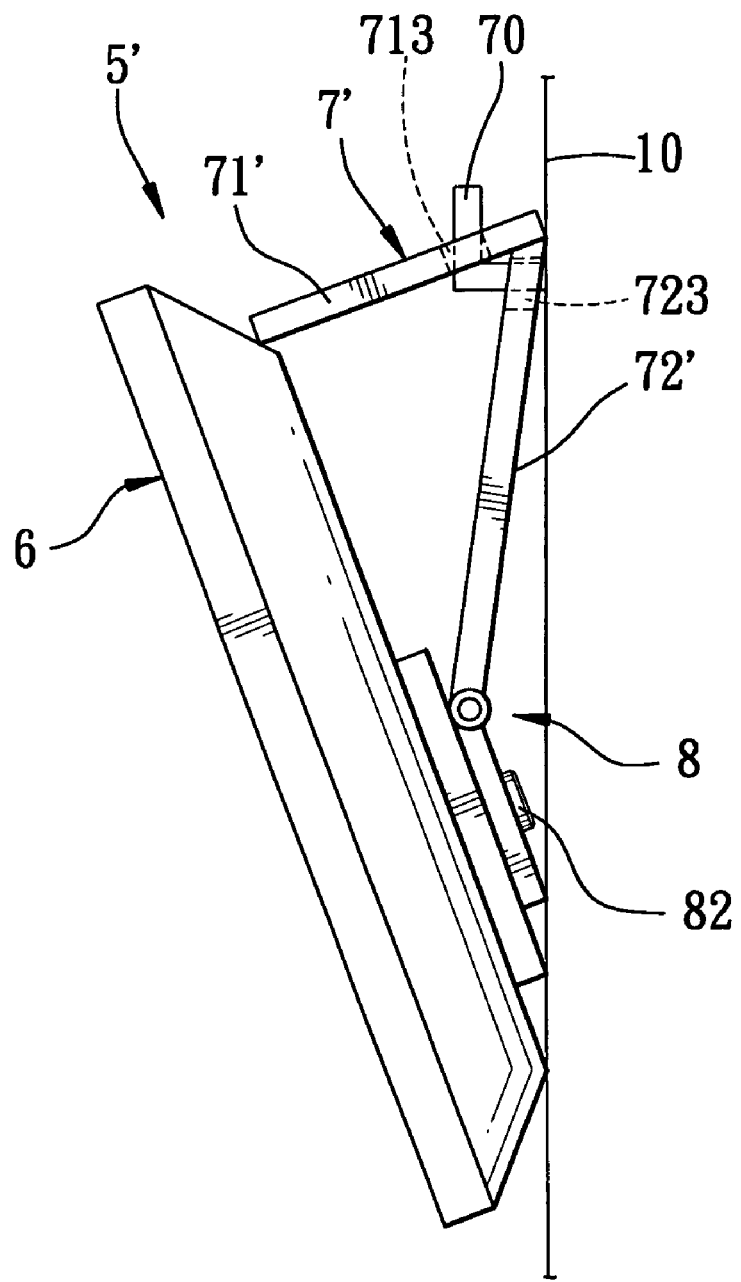
FIG. 7 is a schematic side view illustrating the second preferred embodiment of a display apparatus according to the present invention.

FIG. 7 illustrates the second preferred embodiment of a display apparatus according to this invention, which is a modification of the first preferred embodiment. Unlike the previous embodiment, each of the base portion 71' and the support portion 72' is formed with a through hole 713, 723 so as to permit extension of an anchoring hook 70, which is secured on a wall 10, therethrough when the display panel 5' is disposed in the inclined position. As such, the display apparatus 5' of the present invention can be hung on the wall 10 without the use of an additional suspending frame.

Figure 8:
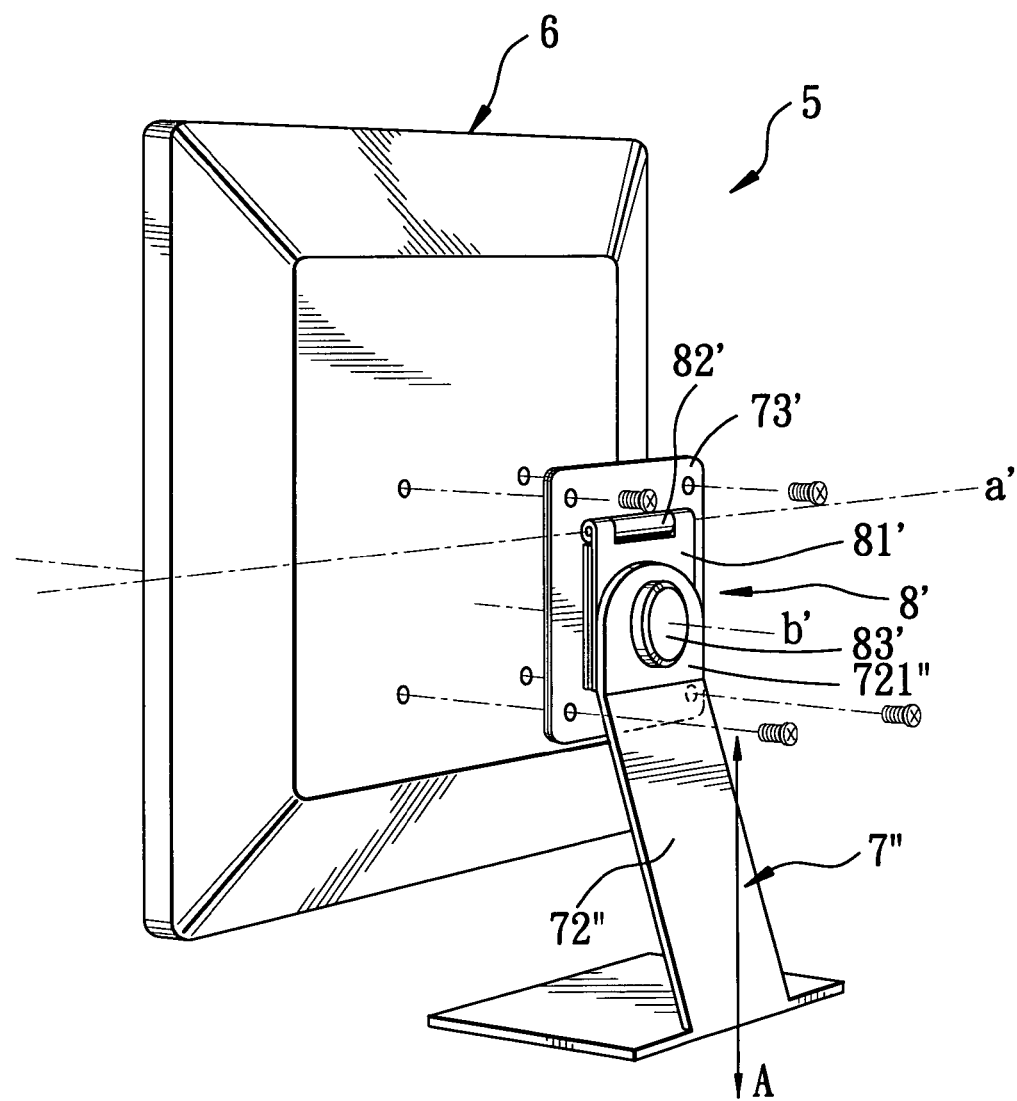
FIG. 8 is an exploded perspective view showing the third preferred embodiment of a display apparatus according to the present invention.

FIG. 8 illustrates the third preferred embodiment of a display apparatus according to this invention, which is a modification of the first preferred embodiment. In this embodiment, the pivot unit 8' includes a pivot plate 81' disposed to confront the coupling member 73', a first pivot member 82' interconnecting pivotally the coupling member 73' and the pivot plate 81' such that the coupling member 73' is rotatable relative to the pivot plate 81' about a first axis (a') parallel to the coupling member 73' and transverse to the upright direction (A), and a second pivot member 83' interconnecting pivotally the pivot plate 81' and the upper pivot end 721" of the support portion 72" such that the pivot plate 81' is rotatable relative to the support portion 72" about a second axis (b') transverse to the coupling member 73'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A display apparatus comprising:
 a display panel having opposite upper and lower ends;
 an adjustable supporting device for supporting said display panel, said supporting device including;
 a support member having a base portion with opposite front and rear ends, and a support portion extending inclinedly from said base portion and formed with a lower connecting end connected to said rear end of said base portion and an upper pivot end opposite to said connecting end in an upright direction;
 a coupling member mounted on said display panel;
 a pivot unit connected pivotally to said support member and said coupling member, and including a pivot plate disposed to confront said coupling member, a first pivot member interconnecting pivotally said coupling member and said pivot plate such that said coupling member is rotatable relative to said pivot plate about a first axis transverse to said coupling member, and a second pivot member interconnecting pivotally said pivot plate and said upper pivot end of said support portion such that said pivot plate is rotatable relative to said support portion about a second axis transverse to the first axis and the upright directions; and
 wherein said adjustable supporting device is capable of supporting said display panel in an inclined position relative to a plane, wherein said lower end of said display panel is adapted to abut against the plane, wherein said rear end of said base portion and said lower connecting end of said support portion are adapted to abut against the plane, and wherein said front end of said base portion abuts against said upper end of said display panel.

2. The display apparatus as claimed in claim 1, wherein said coupling member is formed with a plurality of fastener holes, said adjustable supporting device further including a plurality of screw fasteners extending through said fastener holes and anchored in said display panel.

3. The display apparatus as claimed in claim 1, wherein each of said base portion and said support portion is formed with a through hole so as to permit extension of an anchoring hook therethrough when said display panel is disposed in the inclined position.

4. A display apparatus comprising:
 a display panel having opposite upper and lower ends;
 an adjustable supporting device for supporting said display panel, said supporting device including
 a support member having a base portion with opposite front and rear ends, and a support portion extending inclinedly from said base portion and formed with a lower connecting end connected to said rear end of said base portion and an upper pivot end opposite to said connecting end in an upright direction:
 a coupling member mounted on said display panel;
 a pivot unit connected pivotally to said support member and said coupling member, and including a pivot plate disposed to confront said coupling member, a first pivot member interconnecting pivotally said coupling member and said pivot plate such that said coupling member is rotatable relative to said pivot plate about a first axis parallel to said coupling member and transverse to the upright direction, and a second pivot member interconnecting pivotally said pivot plate and said upper pivot end of said support portion such that said pivot plate is rotatable relative to said support portion about a second axis transverse to said coupling member; and
 wherein said adjustable supporting device is capable of supporting said display panel in an inclined position relative to a plane, wherein said lower end of said display panel is adapted to abut against the plane, wherein said rear end of said base portion and said lower connecting end of said support portion are adapted to abut against the plane, and wherein said front end of said base portion abuts against said upper end of said display panel.

5. The display apparatus as claimed in claim 4, wherein each of said base portion and said support portion is formed with a through hole so as to permit extension of an anchoring hook therethrough when said display panel is disposed in the inclined position.

* * * * *